United States Patent [19]

DeLong

[11] Patent Number: 4,645,541
[45] Date of Patent: Feb. 24, 1987

[54] METHOD OF PRODUCING LEVEL OFF DP MICROCRYSTALLINECELLULOSE AND GLUCOSE FROM LIGNOCELLULOSIC MATERIAL

[76] Inventor: Edward A. DeLong, 439-22560 Wye Rd., Sherwood Park, Alberta T8A 4T6, Canada

[21] Appl. No.: 804,547

[22] Filed: Dec. 4, 1985

[51] Int. Cl.⁴ .......................... C21B 1/36; C13K 1/00; C13K 1/02
[52] U.S. Cl. ........................................ 127/37; 162/14; 162/16; 162/21; 162/22; 426/52; 426/658; 435/105; 435/165; 435/277; 536/56; 127/1
[58] Field of Search ................ 127/37, 1; 162/14, 16, 162/9, 21, 22, 28, 247; 536/56; 435/101, 165, 105, 277, 278; 426/53, 52, 573, 658

[56] References Cited

U.S. PATENT DOCUMENTS

| 3,023,104 | 2/1962 | Battista | 426/573 |
| 3,667,961 | 6/1972 | Algio | 127/37 |
| 4,395,543 | 7/1983 | Wang et al. | 536/56 |
| 4,427,453 | 11/1984 | Reitter | 127/37 |
| 4,427,584 | 1/1984 | LeGrand et al. | 127/37 |
| 4,461,648 | 7/1984 | Foody | 127/37 |

FOREIGN PATENT DOCUMENTS 1141376 2/1983 Canada .................. 162/21

Primary Examiner—Andrew H. Metz
Assistant Examiner—Chung K. Pak

Attorney, Agent, or Firm—Murray and Whisenhunt

[57] ABSTRACT

Microcrystalline cellulose has many applications in the pharmaceutical, food, paper and structural composite industries. Level off DP (Degree of Polymerization) microcrystalline cellulose is made up of a chain of about 250 glucose molecules in the form of microcrystal. In nature, several microcrystals are hinged together and surrounded by amorphous cellulose to form a cellulose microfibril. If the amorphous cellulose is removed, the resultant product is called level off DP (Degree of Polymerization) microcrystalline cellulose. When lignocellulosic material is processed according to applicant's earlier processes (Canadian Pat. Nos. 1,096,374 and 1,141,376), the dissociated material is partitioned by removing the lignin and the xylan leaving a low DP (320) cellulose fraction. This material can be converted to level off DP microcrystalline cellulose and glucose by soaking the cellulose in an acid solution, dewatering it, returning the acid-impregnated cellulose to the reactor, introducing high pressure steam (300–700 psi) and when substantially all of the material reaches a temperature of the order of 215° C., releasing it instantly to atmosphere. This procedure will produce a mixture of level off DP microcrystalline cellulose and glucose. If the acid solution employed is sulfuric acid and the temperature of the cellulose is allowed to reach a uniform temperature of 234° C. before instant release to atmosphere, the procedure will produce substantially all glucose.

10 Claims, 1 Drawing Figure

METHOD OF PRODUCING LEVEL OFF DP MICROCRYSTALLINECELLULOSE AND GLUCOSE FROM LIGNOCELLULOSIC MATERIAL

This invention relates to a method of producing level off DP microcrystalline cellulose and glucose from lignocellulosic material.

More particularly, this invention relates to the use of an explosive depressurization reactor for the production of level off DP microcrystalline cellulose and glucose from lignocellulosic material. Until my inventions to render lignin separable from cellulose and hemicellulose and the product so produced (Canadian Pat. Nos. 1,096,374 and 1,141,376), there was no known economically viable process to cleanly separate undegraded and chemically reactive lignin and the hemicellulose from the cellulose in lignocellulosic material. Thus, until now, acid hydrolysis of lignocellulosic biomass has been done by treating the material as a composite.

In this specification, "lignocellulosic material" includes such plant growth materials as oat hulls, corn stalks, bagasse, wheat straw, oat straw, barley straw and woods of various species, particularly hardwoods. Lignocellulosic material is comprised of three main chemical components—lignin, hemicellulose and cellulose—in the following approximate proportions, plus ash and trace elements:

| Hardwoods | |
|---|---|
| Lignin | 21% |
| Hemicellulose | 24% |
| Cellulose | 48% |
| Annual Plant Material (Straw, Bagasse, etc.) | |
| Lignin | 15% |
| Hemicellulose | 31% |
| Cellulose | 46% |

The cellulose and hemicellulose are both carbohydrates. Cellulose is nature's most abundant chemical, hemicellulose is second and lignin is third. Cellulose is comprised of six-carbon (glucose) sugar molecules. The xylan component (approximately 70%) of the hemicellulose in annuals and hardwoods is comprised mainly of five-carbon (xylose) sugar molecules. The lignin is a complex amorphous molecule comprised of many of the chemical components found in oil and gas such as phenol, benzene, propane, etc. The function of these three materials is the lignocellulosic complex is as follows:

The core of the lignocellulosic fibre is comprised primarily of cellulose. Cellulose is the skeleton in the fibre structure. It occurs as crystalline bundles which support the fabric of the tree or plant.

The hemicellulose and lignin are cross-linked to form a matrix which surrounds the cellulose skeleton and holds the structure together in the manner of resin in a fibreglass composite.

It is this lignin/hemicellulose matrix which provides nature's protection against microbial invasion. It also renders the material water resistant.

With the application of the teachings of Canadian Pat. Nos. 1,096,374 and 1,141,376 the problem, which has baffled scientists and engineers for more than a century, of how to break the intermolecular cross-links between the lignin and the hemicellulose without causing substantial degradation of either of these chemical components has been solved. Once the intermolecular cross-links in the lignocellulosic material have been severed, it is relatively simple to partition the material into its three main chemical components (lignin, hemicellulose and cellulose) using mild organic solvents or weak sodium hydroxide.

The process accomplishes this preliminary result by the following steps:

(a) packing the lignocellulosic material in a divided, exposed moist form in a pressure vessel having a valved outlet, (b) with the valve closed, rapidly filling the pressure vessel with steam at a pressure of 400–700 psi to bring, by means of the pressurized steam, substantially all of the lignocellulosic material to a temperature in the range 185° C. to 240° C. in less than 60 seconds to thermally soften the lignocellulosic material into a plastic condition, and (c) as soon as the said plastic condition has been attained, opening the valved outlet and explosively expelling the lignocellulosic material in the plastic condition, from the pressure vessel through the outlet to atmosphere so that the material issues from the outlet in particulate form with lignin therein rendered into particles substantially in the range 1 to 10 microns and separable from the celluose and hemicelluose, the particulate lignin, hemicelluose and celluose being together in dissociated form having the appearance of potting soil, a major portion of the lignin being soluble in methanol or ethanol and being thermoplastic, the cellulose being in the form of crystalline alpha cellulose microfibrils and suitable for digestion or conversion by micro-organisms and enzymes, (d) extracting the lignin from the mixture using a mild organic solvent such as ethanol, methanol or a weak sodium hydroxide solution at room temperature, then after filtering, (e) separating the remaining material into cellulose and hemicellulose fractions by dissolving the hemicellulose in a weak (1 wt. %) solution of sodium hydroxide at 50°–100° C., the selected temperature depending on the desired extraction time.

Alternatively, steps (d) and (e) can be accomplished by:

(f) extracting the hemicellulose from the whole exploded material with warm (50° C.) water for two hours, then after filtering, (g) extracting the lignin using a mild organic solvent such as ethanol, methanol or a mild (0.1N) solution of sodium hydroxide at room temperature, which after filtering leaves a high purity cellulose fraction.

The resulting fractions (chemical components) are very pure and largely in so-called native or undegraded form. The lignin is amorphous and very delicate chemically when it is isolated from the hemicellulose matrix. It will hydrolyse easily in a mild acid solution at or below its glass transition temperature around 125° C., the required temperature depending on moisture content. Similarly, the xylan component of the hemicellulose is also amorphous and only slightly more rugged chemically than the lignin. It will hydrolyse quite easily in a mild acid solution at its glass transition temperature at or around 165° C., also dependent on moisture content. The crystalline component of the cellulose, on the other hand, is more rugged chemically and significantly more difficult to hydrolyse than the other two, but it will hydrolyse quite readily in a mild acid solution at or slightly above its glass transition temperature of 234° C.

When lignocellulosic material which has not been subject to the explosion process is acid hydrolysed as a composite, the acid reacts initially with the more delicate amorphous (lignin and xylan) components. Before the crystalline cellulose is hydrolysed, they are degraded beyond economic value as a chemical feedstock to what is commonly called a black liquor, and they mix intimately with the glucose, creating toxicity and a difficult separation problem. Moreover, because the microstructure of the composite is resistant to water and other liquids, the wood chip or other untreated feedstock will resist the pentration of the acid and will therefore tend to hydrolyse from the out side of the chip toward the centre. Thus, the glucose which is first produced from the outside of the chip is degraded before the glucose from the inside of the chip is released. This is the fundamental reason why yields of glucose by acid hydrolysis of lignocellulosic materials have until now been limited to below 50% of the theoretical yield.

A cellulose microfilbril is made up of a cellulose microcrystal surrounded by and hinged to the next microcrystal by an amorphous region of cellulose. It has now been found that this amorphous cellulose will hydrolyse to glucose under less harsh hydrolysis conditions of time, temperature, and acid concentration than is required to hydrolyse the microcrystal to glucose. For this reason, under the proper hydrolysis conditions, it has now been found that it is possible to produce microcrystalline cellulose in a glucose solution.

According to the present invention there is provided a method of producing level off DP microcrystalline cellulose and glucose from lignocellulosic material, comprising:

(a) packing the lignocellulosic material in a divided, exposed moist form in a pressure vessel having a valved orifice, (b) rapidly filling the pressure vessel with steam at a pressure of 400–700 psi to bring by means of pressurized steam, substantially all of the lignocellulosic material to a temperature in the range 185°–240° C. in less than 60 seconds to thermally soften the lignocellulosic material into a plastic condition, and (c) as soon as the plastic condition has been attained, opening the valved outlet and explosively expelling the lignocellulosic material in the plastic condition, from the pressure vessel through the outlet to atmosphere, so that the said material issues from the outlet in particulate form with lignin therein rendered into particles substantially in the range 1 to 10 microns and separable from the celluose and hemicellulose; the particulate lignin, hemicellulose and cellulose being together in dissociated form and having the appearance of potting soil, a major portion of the lignin being soluble in methanol or ethanol and being thermoplastic, the cellulose being in the form of crystalline alpha cellulose microfibrils and suitable for digestion or conversion by micro-organisms and enzymes, (d) separating the cellulose in the particulate material from the lignin and hemicellulose, (e) soaking the separated cellulose in an acid solution of at least one acid selected from the group consisting of sulfuric acid, hydrochloric acid and sulfurous acid until the acid is distributed evenly throughout the cellulose, and then reducing the moisture content of the cellulose leaving the cellulose impregnated with acid at a concentration in the range of 0.05% to 2.0% of the weight of the cellulose, (f) packing the acid-impregnated cellulose into a pressure vessel having a valved outlet, (g) rapidly filling the pressure vessel with steam to a pressure in the range 300 psi to 700 psi to bring, by means of the pressurized steam, substantially all of the acid-impregnated cellulose to a temperature in the range of 185°–240° C. in less than 60 seconds, and thereby weakening by hydrolysis and thermal softening, the intramolecular bonds joining the glucose units to form the cellulose, then (h) opening the valved outlet, and explosively expelling the acid-impregnated cellulose from the pressure vessel through the outlet to atmospheric pressure, thereby breaking the intramolecular cross-links in the cellulose to depolymerize the hydrolysed, acid-impregnated cellulose to produce a mixture of cellulose and a glucose solution therefrom, and thereby rapidly reducing the temperature of the extruded material to below 100° C. to prevent further depolymerization of the cellulose and degradation of the glucose, and then (i) neutralizing the acidity of the glucose solution and residual cellulose.

Thus it has now been found, according to the present invention, that when the methods described in Canadian Pat. Nos. 1,096,374 and 1,141,376 are applied to lignocellulosic materials and the cellulose is separated from the resulting product, the cellulose is in the form of cellulose fibrils which are small in size (20–50 microns in diameter, and one or two millimetres in length). These fibrils have been expanded by the mechanical action of the explosive decompression, leaving voids where the lignin and hemicellulose once resided and where acid selected from the group consisting of sulfuric acid, hydrochloric acid and sulfurous acid can easily pentrate. It has further been found, according to the present invention, that when the cellulose is damp with moisture, an acid pre-soak will wick and thereby distribute the acid evenly onto each molecule of cellulose throughout the material. By this means the problem of accessibility of the cellulose to the acid and the problem of achieving an even distribution of acid throughout the cellulose are solved.

In some embodiments of the present invention the moisture content of the acid-impregnated cellulose may be reduced to a level in the range 20% to 80% by weight of the cellulose. This may be achieved by mechanical dewatering. Dewatering facilitates the heating of the cellulose by the steam and prevents the presence of excessive amounts of water in the pressure vessel. Preferably, the moisture content is reduced as much as is reasonably possible. The dewatered acid-impregnated cellulose may then be loaded into the pressure vessel, charged with high pressure steam at pressures between 300 psi and 700 psi, depending on moisture content, to bring the material to a temperature between 185° and 240° C. in less than 60 seconds, preferably less than 45 seconds depending on the temperature and acid concentration. When the desired temperature is reached the acid-impregnated cellulose is explosively expelled to the atmosphere. Preferably, any residual cellulose is filtered from the glucose solution.

In some embodiments of the present invention wherein the neutralized end product is a mixture of glucose from the amorphous component of the cellulose and level off DP microcrystalline cellulose from the crystalline alpha cellulose fraction of the cellulose, the cellulose is impregnated with acid at a concentration of 0.05% to 1.0% of the weight of the cellulose, and the pressure vessel is rapidly filled with steam to a pressure between 350 and 550 psi to bring the acid-impregnated cellulose to a temperature in the range of 200°–225° C. in less than 60 seconds and then explosively expelled to the atmosphere.

If the desired product is a mixture of glucose and level off DP microcrystalline alpha cellulose, it is preferred to use hydrochloric acid to impregnate the cellulose and to treat the cellulose with steam at pressures in the range of 300 to 450 psi. If on the other hand, the desired product is substantially pure glucose, it is preferred to use sulfuric acid to impregnate the cellulose and to treat the cellulose with steam at pressures in the range of 400 to 700 psi.

In some embodiments of the present invention wherein the neutralized end product is a mixture of glucose from the amorphous component of the cellulose and level off DP microcrystalline alpha cellulose from the crystalline alpha cellulose fraction of the cellulose, the cellulose is impregnated with hydrochloric acid at a concentration of about 0.2% of the weight of the cellulose, and the pressure vessel is rapidly filled with steam to a pressure of about 450 psi to bring the acid impregnated cellulose to a temperature of about 215° C. in less than 45 seconds and then explosively expelled to the atmosphere.

In yet other embodiments of the present invention wherein the end product is substantially all glucose, the pressure vessel is rapidly filled with steam to a pressure in the range 400 to 700 psi, to bring the cellulose, which has been impregnated with sulfuric acid to a level in the range 0.5% to 1.5% of the weight of the cellulose, to a temperature in the range 215° to 240° C. in less than 60 seconds and then explosively expelled to the atmosphere.

In other embodiments of the present invention wherein the end product is substantially all glucose, the pressure vessel is rapidly filled with steam to a pressure of about 650 psi to bring the cellulose, which has been impregnated with sulphuric acid to a level of about 1.0% of the weight of the cellulose, to a temperature of about 234° C. in less than 45 seconds. The contents of the pressure vessel are then explosively expelled to the atmosphere.

Preferably, condensate, which is produced when the high pressure steam contacts the relatively cool cellulosic material, is removed from the bottom of the pressure vessel as it is formed.

Any residual cellulose may be treated with enzymes for the conversion thereof to glucose or retreated in the pressure vessel.

In the accompanying drawings which illustrates an embodiment of the invention,

BRIEF DESCRIPTION OF THE DRAWING

In FIG. 1, there is shown a pressure vessel 2, having a valved outlet which in the embodiment illustrated is an extrusion die outlet 6, an extrusion die closure plug 30, a loading end closure flap 8, and steam inlet orifices 10 to 12. The pressure vessel 2 has a bottleneck portion 14 leading to the die 4 and entry ports 16 and 18 for temperature probes (not shown).

Figure 1:
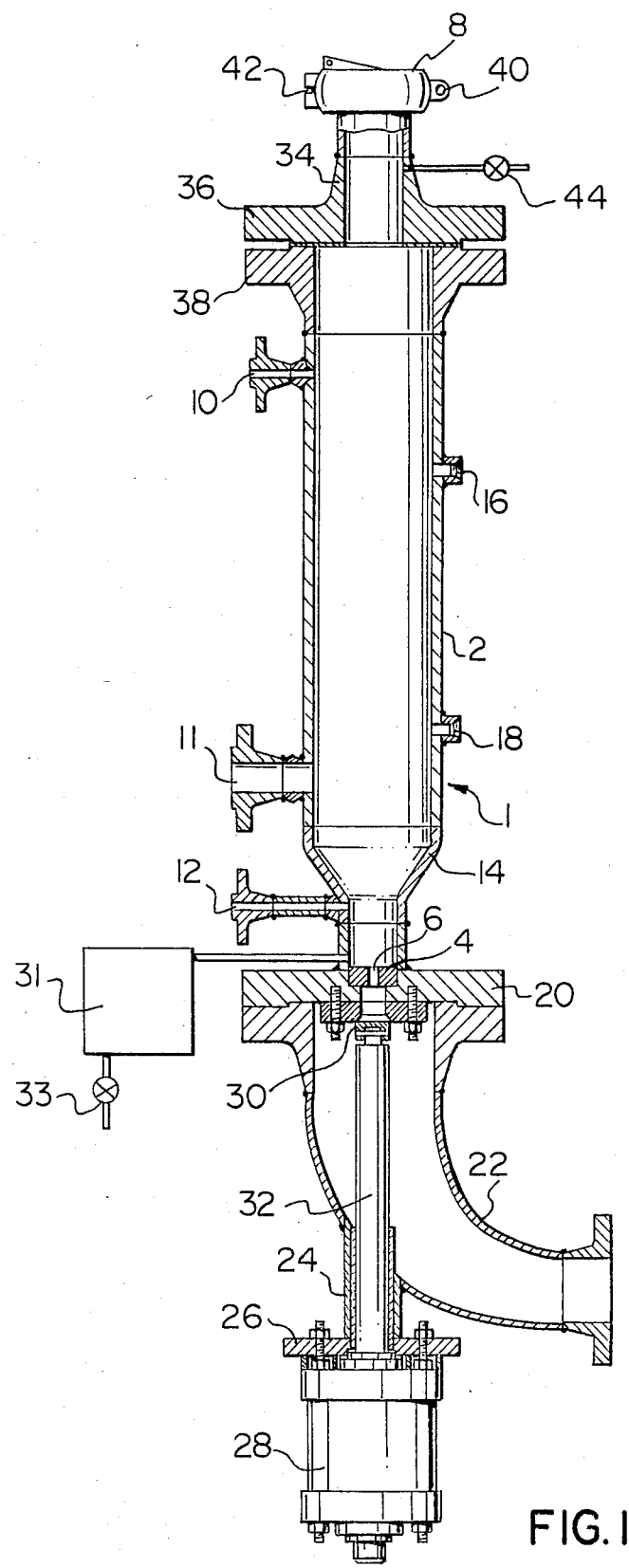
FIG. 1 is a sectional side view of a pressure vessel having a valved outlet.

The front end of the pressure vessel 2, containing the die outlet 14, has a flange 20 to which is sealed a curved impinging tube 22 which gradually reduces in cross-section in a downstream direction. The curved impinging tube 22 has a spindle inlet sleeve 24 provided with a flange 26. A pneumatic ram 28 is attached to the flange 26 and has a die closure plug 30 mounted on the spindle 32 of the ram 28. A condensate drainage tank 31 is provided having an outlet valve 33, thus permitting the removal of condensate as it is formed.

The rear end 34 of the pressure vessel 2 is sealed to the remainder by flanges 36 and 38 and has the loading end closure flap 8 hinged thereto by a hinge 40 and sealable therewith by a clamp 42. The rear end 34 has a venting safety valve 44.

The pressure vessel shown in FIG. 1 may be used in the process described herein both in the initial step of pressurizing and explosively expelling the divided lignocellulosic material, and in the subsequent step of pressurizing and explosively expelling the acid-impregnated cellulose fibrils.

In operation the loading end closure flap 8 is opened and the pressure vessel 2 is loaded with lignocellulosic material in a divided form with the die closure plug 30 closing the die outlet 4. A rod (not shown) is used to pack the lignocellulosic material in the pressure vessel 2.

With the pressure vessel 2 completely filled with lignocellulosic material the die closure plug 30 is sealed by the pneumatic ram 28 and the closure plug 8 is sealed to the rear end 34 by the clamp 42 and then the pressure vessel is filled with steam at a pressure in the range 400 to 700 psi, at a sufficient temperature to raise the temperature of the lignocellulosic material to a temperature in the range 185° to 240° C., in less than 60 seconds to thermally soften the lignocellulosic material into a plastic by injecting steam into the steam inlet orifices 10 to 12 from a source (not shown). The temperature probes (not shown) in the ports 16 and 18 are used to monitor the temperature of the lignocellulosic material in the pressure vessel 2 to determine when the lignocellulosic material has reached the chosen temperature.

As soon as the lignocellulosic material in the pressure vessel 2 reaches the desired temperature the pneumatic ram 28 is actuated to withdraw the closure plug 30 and more or less instantaneously open the die outlet 4 to atmosphere so that the lignocellulosic material is extruded through the die outlet 4 in the plasticized condition and at the extrusion pressure and is flashed to atmosphere preferably in milli-seconds along the curved impinging tube 22. This sudden release to atmosphere explosively expels the lignocellulosic material in the plasticized condition and produces a particulate material having the appearance of potting soil which stains the fingers brown and has a high enough specific gravity to sink like a stone in water.

While the curved impinging tube is not essential it has the advantage of utilizing some of the extrusion force to further comminute the lignocellulosic material in addition to the comminution obtained by extrusion.

The cellulose is then separated from the particulate product, by the methods described above. It is then soaked in a solution of sulfuric, hydrochloric or sulfurous acid and the moisture content reduced.

The loading end closure flap 8 of the pressure vessel 2 is then opened and the pressure vessel is loaded with the acid-impregnated cellulose with the die closure plug 30, and the valve 33 closed.

With the pressure vessel 2 completely filled with acid-impregnated cellulose, the die closure plug 30 is sealed by the pneumatic ram 28 and the closure plug 8 is sealed to the rear end 34, by the clamp 42, and then the pressure vessel is filled with steam at a pressure between 300 psi and 700 psi, to bring the cellulose to a temperature between 185° and 240° C. in less than 60 seconds, preferably less than 45 seconds, depending on the moisture content of the material and the pH of the acid solution impregnated into the cellulose. The temperature probes (not shown) in the ports 16 and 18 are used to monitor the temperature of the acid-impregnated cellulose to determine when the cellulose has reached the chosen temperature.

As soon as the cellulose in the pressure vessel has reached the desired temperature, the valved outlet is opened and the material is explosively expelled from the pressure vessel through the outlet to atmosphere.

The percentage of acid used in the impregnation step will depend on the temperature to be used, the time to achieve that temperature and the moisture content of the impregnated cellulose. In any case, acid concentration will be no more than two percent of the dry weight of the material, and usually much less. The object of the process is to weaken, by acid hydrolysis and heat, the intramolecular bonds joining the glucose units to form the cellulose. The combination of the acid hydrolysis and the mechanical shock caused by the instant decompression and the expulsion through the outlet will fracture those bonds, producing a high concentration of glucose and at the same time reducing the pressure to atmosphere, thus reducing the temperature to below 100° C. which will quench further chemical hydrolysis.

The resulting product can then be neutralized by a suitable base and filtered to remove the residual cellulose which can be used as described above or returned to the pressure vessel for a second treatment, or passed to an enzymatic hydrolysis process to complete the conversion to glucose.

During the first few seconds after the steam is introduced into the reactor, contact with the relatively cool cellulosic material produces a liquid condensate. This condensate covers between 10 and 30 percent of the cellulosic material depending on the moisture content and the starting temperature of the cellulose feedstock, thus preventing proper processing of the submerged cellulosic material. The tank 31 for removing that condensate, as it is formed, substantially improves the performance of the process.

What is claimed is:

1. A method of producing level off DP microcrystalline cellulose and glucose from lignocellulosic material, comprising:
   (a) packing the lignocellulosic material in a divided, exposed, moist form in a pressure vessel having a valved outlet,
   (b) with the valved outlet closed, rapidly filling the pressure vessel with steam at a pressure of 400–700 psi to bring, by means of the pressurized steam, substantially all of the lignocellulosic material to a temperature in the range 185° to 240° C. in less than 60 seconds to thermally soften the lignocellulosic material into a plastic condition, and
   (c) as soon as the said plastic condition has been attained, opening the valved outlet and explosively expelling the lignocellulosic material in the said plastic condition, from the pressure vessel through the outlet to atmosphere so that the said material issues from the outlet in particulate form with lignin therein rendered into particles substantially in the range 1 to 10 microns and separable from the cellulose and hemicellulose, the particulate lignin, hemicellulose and cellulose being together in dissociated form having the appearance of potting soil, a major portion of the lignin being soluble in methanol or ethanol and being thermoplastic, the cellulose being in the form of crystalline alpha cellulose microfibrils and suitable for digestion or conversion by micro-organisms and enzymes,
   (d) separating the cellulose in the particulate material from the lignin and hemicellulose,
   (e) soaking the separated cellulose in an acid solution of at least one acid selected from the group consisting of sulfuric acid, hydrochloric acid and sulfurous acid until the acid is distributed evenly throughout the cellulose, and then reducing the moisture content of the cellulose, leaving the cellulose impregnated with acid at a concentration in the range 0.05% to 2.0% of the weight of the cellulose,
   (f) packing the acid-impregnated cellulose into a pressure vessel having a valved outlet,
   (g) rapidly filling the pressure vesel with steam to a pressure in the range 300 psi to 700 psi to bring, by means of the pressurized steam, substantially all of the acid-impregnated cellulose to a temperature in the range of 185°–240° C. in less than 60 seconds, and thereby weaken by hydrolysis and thermal softening, the intramolecular bonds joining the glucose units to form the cellulose, then
   (h) opening the valved outlet, and explosively expelling the acid-impregnated cellulose from the pressure vessel through the outlet to atmospheric pressure, thereby breaking the intramolecular cross-links in the cellulose to depolymerize the hydrolysed, acid-impregnated cellulose to produce a mixture of cellulose and a glucose solution therefrom, and thereby rapidly reducing the temperature of the extruded material to below 100° C. to prevent further depolymerization of the cellulose and degradation of the glucose, and then
   (i) neutralizing the acidity of the glucose solution and residual cellulose.

2. A method according to claim 1, wherein any residual cellulose is filtered from the glucose solution.

3. A method according to claim 1, wherein the acid-impregnated cellulose is reduced to a moisture content of the level in the range of 20% to 80% by weight of the cellulose before being packed into the pressure vessel.

4. A method according to claim 1, wherein the end product is a mixture of glucose from the amorphous component of the cellulose and level off DP microcrystalline cellulose from the crystalline alpha cellulose fraction of the cellulose, and the cellulose is impregnated with acid at a concentration of 0.05% to 1.0% of the weight of the cellulose, and the pressure vessel is rapidly filled with steam to a pressure between 350 psi and 550 psi to bring the acid-impregnated cellulose to a temperature in the range of 200° C. to 225° C. in less than 60 seconds.

5. A method according to claim 1, wherein the end product is a mixture of glucose from the amorphous component of the cellulose and level off DP microcrystalline alpha cellulose from the crystalline alpha cellulose fraction of the cellulose, and the cellulose is impregnated with hydrochloric acid at a concentration of about 0.2% of the weight of the cellulose, and the pressure vessel is rapidly filled with steam to a pressure of about 450 psi to bring the acid-impregnated cellulose to a temperature of about 215° C. in less than 45 seconds.

6. A method according to claim 1, wherein the end product is substantially all glucose, the pressure vessel is rapidly filled with steam to a pressure in the range 400 psi to 700 psi, to bring the cellulose, which has been impregnated with sulfuric acid to a level in the range 0.5% to 1.5% of the weight of the cellulose, to a temperature in the range 215° C. to 240° C., in less than 60 seconds.

7. A method according to claim 1, wherein the end product is substantially all glucose, the pressure vessel is rapidly filled with steam to a pressure of about 650 psi to bring the cellulose, which has been impregnated with sulfuric acid to a level of about 1% of the weight of the cellulose, to a temperature of about 234° C., in less than 45 seconds.

8. A method according to claim 1, wherein liquid condensate is removed from the bottom of the pressure vessel as it is formed.

9. A method according to claim 1, wherein steps (e) to (i) are repeated on any residual cellulose.

10. A method according to claim 1, wherein any residual cellulose is treated with enzymes for the conversion thereof to glucose.

* * * * *